Patented Feb. 1, 1938

2,107,060

UNITED STATES PATENT OFFICE 2,107,060

METHOD OF PREPARING PHENOLIC COMPOUNDS

John F. Olin, Grosse Ile, Mich., assignor to The Sharples Solvents Corporation, Philadelphia, Pa.

No Drawing. Application December 6, 1935, Serial No. 53,210

19 Claims. (Cl. 260—154)

The present invention pertains to the condensation of unsaturated hydrocarbons and their derivatives with aromatic compounds, such as phenols, cresols, naphthols, etc., having an hydroxyl radical substituted for a nuclear hydrogen atom. An example of such a condensation reaction is the condensation of trimethyl ethylene with phenol to produce para tertiary amyl phenol.

The invention was conceived in connection with research upon the problem of condensing olefin hydrocarbons with phenol to produce para alkyl phenols and it is particularly useful in connection with an operation of that character. In an operation of this kind, it is usually important that the desired para alkyl compound be produced in a form in which it contains only a very small proportion of impurities in the nature of di-alkyl phenols, sulphonic acids, ethers, ortho-alkyl phenols and other products of incidental reactions which may occur in connection with the production of the ortho-alkyl compound.

In the prior patent of William M. Lee and Lee H. Clark, No. 2,050,188, dated August 4, 1936 and the application of Charles G. Grosscup, Serial No. 662,528, filed March 24, 1933 processes were described in which para alkyl phenols are produced from crude materials comprising as principal reactants phenol on the one hand and an isomeric mixture of olefins on the other. These applications describe and claim processes whose object is to effect the reaction of a mixture of olefin material containing two or more olefins of which at least one is more reactive than the other or others with phenol in such a manner as to effect selective reaction of the more reactive ingredient of the mixture to the substantial exclusion of the remainder.

An illustrative example of a process which may be carried out by operations such as disclosed in the Lee and Clark and Grosscup applications is the condensation with phenol of trimethyl ethylene from a mixture of isomeric olefins including pentene 2 to the virtual exclusion of the pentene 2 which is present in the isomeric mixture. While the processes disclosed in these co-pending applications have been relatively successful in the practice of such operations, the relative proportion of impurities present in the desired para-tertiary amyl phenol is larger than desired and it is the particular object of the present invention to effect a selective condensation as described in these applications, and particularly in the Grosscup application, in such a manner as to materially reduce the quantity of such impurities. It is therefore another object of the present invention to condense a mixture of more reactive and less reactive olefins with an hydroxy aromatic compound, such as phenol, in such a manner as substantially to exclude reaction of the less reactive ingredient of the mixture with the aromatic compound.

In the practice of the Grosscup invention, a mixture of olefins was first treated with the phenolic compound to be condensed at substantially normal temperature. A very small trace of an acid adapted to act as a catalyst was thereafter added to the mixture of phenol and hydrocarbon and intimately mixed therewith, the mixture being refluxed to cause a preliminary reaction to take place between the olefin and the phenolic compound, this treatment being carefully controlled to prevent the reaction of the phenolic compound with the olefin material in the mixture other than that which it was desired to condense.

The mixture of reacted and unreacted material was next distilled and the heads passing off at a temperature within the boiling range of the olefin were separately collected. The residue was thereafter digested by heating it to a temperature adapted to cause a conversion of the reaction products of the olefin and phenol, this treatment being continued for a considerable period of time in order to effect a substantially complete conversion of the initial condensation product.

While the operation above described resulted in important economies over the prior Lee and Clark process described in Patent 2,050,188, it yielded a product whose melting range indicated that it did not possess the optimum desirable degree of purity. While the applicant does not wish to be limited to any particular chemical theory with respect to the present invention, it is his opinion that the degree of impurity present in the Grosscup product was largely attributable to the following causes:

1. The removal of the less reactive olefin, such as the pentene 2 from a mixture of pentene 2 and trimethyl ethylene, by distillation, resulted in undesired condensation with the phenol present of a part of the material whose removal was sought and consequent contamination of the desired phenolic derivative with this material.

2. The practice of the final digesting operation in the presence of sulphuric acid and of acetic acid resulted in the production of a number of undesired by-products, such as acetates, etc. The occurrence of these undesired reactions also resulted in a reduction of the yield which might be obtained from the practice of such a process under more nearly ideal conditions, and a further object of the present invention has been to improve the yields obtained by the Grosscup and Lee and Clark processes.

The present invention rests upon the discovery that a modification of the Grosscup process by which the acid used in connection with the initial condensation step is neutralized, the intermediate product thereafter subjected to a distillation operation, and finally digested with aluminum chloride, zinc chloride, ferric chloride, sulphuric acid or other equivalent rearranging catalyst, results in a very substantial improvement of that process in the particulars discussed above. In connection with this invention, the very best results have been obtained by the use of aluminum chloride as the re-arranging catalyst, although zinc chloride has also been found to be useful and other catalysts known to the art may be used with substantial improvement over the Grosscup results, provided the acid used in the initial condensation reaction be neutralized before distillation of the initial reaction mixture to effect removal of unreacted olefin and dehydration. It will thus be seen that the fundamental feature of the invention consists in the nullification of the catalytic effect of the acid condensing agent of the Grosscup process upon the less reactive olefin and phenol which occurred in the distillation step of the Grosscup process, by neutralization of this acid catalyst prior to such distillation and that the present invention contemplates fundamentally the performance of this neutralization step and the subsequent rearrangement operation in the presence of other catalysts than that which was used in the initial condensation.

The detailed procedure of the present invention in the treatment of a mixture of olefins containing a more reactive and a less reactive ingredient to condense the more reactive ingredient with phenol to the substantial exclusion of the less reactive ingredient and to produce a para alkyl derivative by condensation of the more reactive ingredient with phenol is as follows: The mixture of olefins, such for example as a mixture of trimethyl ethylene and pentene 2, is first intimately mixed with a quantity of phenol constituting a molecular equivalent of the olefin to be reacted, or somewhat more than the molecular equivalent, and a small quantity of an acid catalyst is thereafter added to the mixture so produced. Reaction between the more reactive ingredient and the phenol commences immediately and is controlled by reflux and external cooling. When the reaction has proceeded to the desired extent, the catalytic acid is neutralized and unreacted olefin is thereafter distilled from the mixture. At the completion of the distillation of the unreacted olefin, the condensation product which consists of a variety of compounds is further distilled to remove water and other undesired compounds. The remaining mixture is then cooled and the rearrangement catalyst is added. The rearrangement is accomplished by heating the mixture to which the rearrangement catalyst has been added for a sufficient length of time to accomplish the maximum degree of conversion of undesired side re-action products into the desired phenolic derivative. The following detailed examples illustrate the practice of the process.

Example 1

1880 grams of phenol and 3000 grams of an amylene mixture containing approximately 50% normal amylenes and 50% branched chain amylenes were placed in a 12 liter flask and stirred during the addition of 20 cc. of concentrated sulphuric acid thereto. Immediate reaction set in and this reaction was moderated by reflux and external cooling to maintain the reaction temperature at about 45° C. The material was allowed to stand over night and 57 grams of 50% sodium hydroxide solution were added while stirring the mixture. Unreacted amylene was distilled off between 30° and 40° C. and was found to weigh 1557 grams.

The amylene so recovered was of remarkable purity, having an Engler distillation range between 34° and 36.6° C. This boiling range indicates only one isomer, (pentene 2), a fact further substantiated by routine analysis of the material which showed 0% isoamylene.

After the pentene 2 was distilled off, the fractionation was continued until a temperature of 180° C. was reached, thus effecting removal of the water and small amounts of hexane and hexylene which were present as impurities in the initial olefin mixture and of diamylene incidentally formed in the practice of the preceding parts of the process. The contents of the flask were cooled to 80° C. and 50 grams of anhydrous aluminum chloride powder were added. Rearrangement was then accomplished by heating for one hour on an oil bath at a temperature between 130 and 140° C. After cooling the mixture so produced to 100° C., the crude tertiary amyl phenol was washed with 1000 cc. of 1% hydrochloric acid solution and 1000 cc. of hot water, (to remove aluminum chloride), and finally with 1000 cc. of 1% sodium carbonate solution. Upon distillation at atmospheric pressure through a 150 x 5 cm. packed column, the following cuts were obtained:

| Cut No. | Boiling point | Weight | Identity |
|---|---|---|---|
| | | Grams | |
| 1 | To 120° | 60 | Water, amylene |
| 2 | 120–200° | 476 | Phenol |
| 3 | 200–250° | 51 | Ortho tertiary amyl phenol |
| 4 | 250–260° | 2015 | Para tertiary amyl phenol (softening point 84°) |
| Residue | | 266 | |

Conversion = 61.3%
Yield = 80.0%

Example 2

Condensation of amylene and phenol was effected as in the prior example. The crude condensation product was neutralized and dehydrated by distillation. The mass was thereafter heated for three hours at 140° C. with 50 grams of zinc chloride and 50 grams of hydrogen chloride. The material was boiled with 1000 cc. of water and washed with 1000 cc. of water and 1000 cc. of 2% sodium carbonate solution. After a second washing the material was fractionated through a column such as used in the prior example and yielded the following cuts:

| Cut No. | Boiling point | Weight | Identity |
|---|---|---|---|
| | | Grams | |
| 1 | To 150° | | Water, amylene. |
| 2 | 150–200° | 319 | Phenol |
| 3 | 200–250° | 162 | Ortho tertiary amyl phenol |
| 4 | 250–260° | 1740 | Para tertiary amyl phenol (softening point 73°) |
| Residue | | 682 | |

Conversion = 53%
Yield = 64%

Example 3

20 mols of phenol and 3000 grams of mixed amylene were condensed, neutralized and dehydrated as in the prior examples. 25 cc. of concentrated sulphuric acid were then added to the refluxed mixture and the heating continued at 140° C. for four hours more, at the end of which time rearrangement appeared complete. The material was thereafter washed and fractionated and yielded the following cuts:

| Cut No. | Boiling point | Weight | Identity |
|---|---|---|---|
|  |  | Grams |  |
| 1 | 170–200° | 248 | Phenol |
| 2 | 200–250° | 68 | Ortho and para tertiary amyl phenol |
| 3 | 250–257° | 2160 | Para tertiary amyl phenol (softening point 80.5°) |
| Residue |  | 394 |  |

Conversion = 65.9%
Yield = 76%

Example 4

2950 grams of ortho cresol and 4096 grams of an amylene mixture similar to that of Example 1 were placed in a 12 liter flask and stirred during the addition of 25 cc. of concentrated sulphuric acid thereto. Immediate reaction set in and this reaction was moderated by external cooling to maintain the reaction temperature at about 45° C. The material was neutralized and distilled to remove water and olefin as in Example 1. The contents of the flask were then cooled to 80° C. and 50 grams of aluminum chloride were added. Rearrangement was then accomplished by heating for two hours at a temperature of 140° C. and the resulting material was washed, neutralized and distilled to yield the following cuts:

| Cut No. | Boiling point | Weight | Identity |
|---|---|---|---|
|  |  | Grams |  |
| 1 | 180–200° | 1210 | Ortho cresol |
| 2 | 200–260° | 72 | Intermediate |
| 3 | 260–263° | 1997 | Tertiary amyl ortho cresol |
| Residue |  | 49 |  |

The tertiary amyl ortho cresol is a pale yellow viscous oil.

Example 5

2320 grams of mixed liquid normal and iso-butylenes containing 2320 grams of iso-butylene and 2209 grams of phenol were placed in a bronze autoclave together with 20 cc. of concentrated sulphuric acid. The materials were stirred for 15 minutes and thereafter allowed to stand for 24 hours. On opening the autoclave a portion of the normal butylene evaporated. The remaining material was placed in a 12 liter flask, neutralized by addition of 285 grams 10% NaOH, the remaining normal butylene evaporated off and the material dried by distillation. The crude ortho tertiary butyl phenol was then isomerized by heating 2 hours with 60 grams $Al_2Cl_6$ at 140° C., and, after washing in the usual manner, distilled.

| Cut No. | Boiling point | Weight | Identity |
|---|---|---|---|
|  |  | Grams |  |
| 1 | 170–200° | 222 | Phenol |
| 2 | 200–233° | 47 | Ortho tertiary butyl phenol |
| 3 | 233–235° | 293 | Para tertiary butyl phenol (softening point 78°) |
| 4 | 235–242° | 2035 | Para tertiary butyl phenol (softening point 84°) |
| Residue |  | 445 |  |

While I have described the above invention specifically with respect to an operation in which a mixture of olefins is condensed with phenol in such a manner as to effect selective condensation of a single ingredient of the mixture, I wish it to be understood that the invention is not limited to this detailed procedure, as the feature of condensation in the presence of an acid catalyst and subsequent rearrangement in the presence of one of the catalysts described above, and preferably in the presence of aluminum chloride, will probably find utility in connection with the practice of condensation operations in which but a single olefin or other unsaturated hydrocarbon is to be condensed with an aromatic hydroxy compound in which an hydroxyl radical is substituted in the nucleus. Other modifications will be obvious to those skilled in the art and I do not therefore wish to be limited except by the scope of the sub-joined claims.

I claim:

1. The method of effecting reaction between an unsaturated hydrocarbon and an aromatic compound substituted in the nucleus by an hydroxyl radical which comprises effecting initial condensation between the aromatic compound and said unsaturated hydrocarbon in the presence of an acid catalyst, neutralizing the acid catalyst, and thereafter effecting rearrangement of the reaction products so produced by heating in the presence of a Friedel and Crafts catalyst.

2. The method of effecting reaction between an unsaturated hydrocarbon and an aromatic compound substituted in the nucleus of an hydroxyl radical which comprises effecting initial condensation between the aromatic compound and said unsaturated hydrocarbon in the presence of an acid catalyst, neutralizing the acid catalyst, and thereafter effecting rearrangement of the reaction products so produced by heating in the presence of a catalyst chosen from the class consisting of aluminum chloride and zinc chloride.

3. The method of effecting reaction between an olefin and an aromatic compound substituted in the nucleus by an hydroxyl radical which comprises effecting initial condensation between the aromatic compound and said olefin in the presence of an acid catalyst, neutralizing the acid catalyst, and thereafter effecting rearrangement of the reaction products so produced by heating in the presence of a Friedel and Crafts catalyst.

4. The method of effecting selective reaction between a portion of an unsaturated hydrocarbon mixture and an aromatic compound substituted in the nucleus by an hydroxyl radical which comprises effecting initial condensation between the aromatic compound and the more reactive portion of said unsaturated hydrocarbon mixture in the presence of an acid catalyst under conditions controlled to substantially preclude reaction between said aromatic compound and the less reactive portion of said unsaturated hydrocarbon mixture, neutralizing the acid catalyst, and thereafter effecting rearrangement of the reaction products so produced by heating in the presence of a Friedel and Crafts catalyst.

5. The method of effecting selective reaction between a portion of an olefin mixture and an aromatic compound substituted in the nucleus by an hydroxyl radical which comprises effecting initial condensation between the aromatic compound and the more reactive portion of said olefin mixture in the presence of an acid catalyst under conditions controlled to substantially preclude reaction between said aromatic compound and the less reactive portion of said olefin mixture, neutralizing the acid catalyst, and thereafter effecting rearrangement of the reaction products so produced by heating in the presence of a Friedel and Crafts catalyst.

6. The method of effecting selective reaction between a portion of an unsaturated hydrocarbon mixture and an aromatic compound substituted in the nucleus by an hydroxyl radical which comprises effecting initial condensation between the aromatic compound and the more reactive portion of said unsaturated hydrocarbon mixture in the presence of an acid catalyst under conditions controlled to substantially preclude reaction between said aromatic compound and the less reactive portion of said unsaturated hydrocarbon mixture, neutralizing the acid catalyst, distilling the less reactive olefin material from the condensation product and thereafter effecting rearrangement of the reaction products so produced by heating in the presence of a Friedel and Crafts catalyst.

7. The method of effecting selective reaction between a portion of an unsaturated hydrocarbon mixture and an aromatic compound substituted in the nucleus by an hydroxyl radical which comprises effecting initial condensation between the aromatic compound and the more reactive portion of said unsaturated hydrocarbon mixture in the presence of an acid catalyst under conditions controlled to substantially preclude reaction between said aromatic compound and the less reactive portion of said unsaturated hydrocarbon mixture, neutralizing the acid catalyst, distilling the less reactive olefin material from the condensation product and thereafter effecting rearrangement of the reaction products so produced by heating in the presence of a catalyst chosen from the class consisting of sulphuric acid, aluminum chloride, zinc chloride and ferric chloride.

8. The method of effecting selective reaction between ingredients of an isomeric olefin mixture comprising branch chain and normal olefin and an aromatic compound substituted in the nucleus by an hydroxyl radical which comprises effecting initial condensation between the aromatic compound and the branch chain olefin of the mixture in the presence of an acid catalyst under conditions controlled to substantially preclude reaction between said aromatic compound and the normal olefin of the mixture, neutralizing the acid catalyst, removing the normal olefin from the reaction mixture and thereafter effecting rearrangement of the reaction products so produced by heating in the presence of a Friedel and Crafts catalyst.

9. The method of effecting selective reaction between ingredients of an isomeric olefin mixture comprising branch chain and normal olefin and an aromatic compound substituted in the nucleus by an hydroxyl radical which comprises effecting initial condensation between the aromatic compound and the branch chain olefin of the mixture in the presence of an acid catalyst under conditions controlled to substantially preclude reaction between said aromatic compound and the normal olefin of the mixture, neutralizing the acid catalyst, removing the normal olefin from the reaction mixture and thereafter effecting rearrangement of the reaction products so produced by heating in the presence of a catalyst chosen from the class consisting of aluminum chloride, zinc chloride, ferric chloride and sulphuric acid.

10. The method of effecting selective reaction between ingredients of an isomeric olefin mixture comprising branch chain and normal olefin and an aromatic compound substituted in the nucleus by an hydroxyl radical which comprises effecting initial condensation between the aromatic compound and the branch chain olefin of the mixture in the presence of an acid catalyst under conditions controlled to substantially preclude reaction between said aromatic compound and the normal olefin of the mixture, neutralizing the acid catalyst, removing the normal olefin from the reaction mixture and thereafter effecting rearrangement of the reaction products so produced by heating in the presence of aluminum chloride.

11. The method of producing para tertiary amyl phenol which comprises mixing an olefin composition containing branch chain amylene and normal amylene with phenol and effecting initial condensation between the phenol and the branch chain amylene in the presence of an acid catalyst under conditions controlled to substantially preclude reaction between the phenol and normal amylene, neutralizing the acid catalyst, removing normal amylene from the mixture by distillation and thereafter effecting rearrangement of the reaction products so produced by heating in the presence of a Friedel and Crafts catalyst.

12. The method of producing para tertiary amyl phenol which comprises mixing an olefin composition containing branch chain amylene and normal amylene with phenol and effecting initial condensation between the phenol and the branch chain amylene in the presence of an acid catalyst under conditions controlled to substantially preclude reaction between the phenol and normal amylene, neutralizing the acid catalyst, removing normal amylene from the mixture by distillation and thereafter effecting rearrangement of the reaction products so produced by heating in the presence of aluminum chloride.

13. The method of effecting selective reaction between an amylene mixture containing branch chain amylene and normal amylene and an aromatic compound substituted in the nucleus by an hydroxyl radical which comprises effecting initial condensation between the aromatic compound and the branch chain amylene of the mixture in the presence of an acid catalyst under conditions controlled to substantially preclude reaction between the normal amylene of the mixture and said aromatic compound, neutralizing the acid catalyst, removing the normal amylene by distillation and thereafter effecting rearrangement of the reaction products so produced by heating in the presence of a Friedel and Crafts catalyst.

14. The method of effecting selective reaction between an amylene mixture containing branch chain amylene and normal amylene and an aromatic compound substituted in the nucleus by an hydroxyl radical which comprises effecting initial condensation between the aromatic compound and the branch chain amylene of the mixture in the presence of an acid catalyst under conditions controlled to substantially preclude reaction between the normal amylene of the mixture and said aromatic compound, neutralizing the acid catalyst, removing the normal amylene by distillation and thereafter effecting rearrangement of the reaction products so produced by heating in the presence of a catalyst chosen from the class consisting of aluminum chloride, zinc chloride, ferric chloride and sulphuric acid.

15. The method of effecting selective reaction between an amylene mixture containing branch chain amylene and normal amylene and an aromatic compound substituted in the nucleus by an hydroxyl radical which comprises effecting initial condensation between the aromatic compound and the branch chain amylene of the mixture in the presence of an acid catalyst under conditions controlled to substantially preclude reaction between the normal amylene of the mixture and said aromatic compound, neutralizing the acid catalyst, removing the normal amylene by distillation and thereafter effecting rearrangement of the reaction products so produced by heating in the presence of aluminum chloride.

16. The method of producing a para-tertiary alkyl cresol which comprises mixing an olefin composition containing branch chain olefin and normal olefin with cresol and effecting initial condensation between the cresol and the branch chain olefin in the presence of an acid catalyst under conditions controlled to substantially preclude reaction between the cresol and the normal olefin, neutralizing the acid catalyst, removing normal olefin from the mixture by distillation and thereafter effecting rearrangement of the reaction products so produced by heating in the presence of a Friedel and Crafts catalyst.

17. The method of producing a para-tertiary amyl cresol which comprises mixing an olefin composition containing branch chain amylene and normal amylene with cresol and effecting initial condensation between the cresol and the branch chain amylene in the presence of an acid catalyst under conditions controlled to substantially preclude reaction between the cresol and the normal amylene, neutralizing the acid catalyst, removing normal amylene from the mixture by distillation and thereafter effecting rearrangement of the reaction products so produced by heating in the presence of a Friedel and Crafts catalyst.

18. The method of producing para-tertiary butyl phenol which comprises mixing an olefin composition containing branch chain butylene and normal butylene with phenol and effecting initial condensation between the phenol and the branch chain butylene in the presence of an acid catalyst under conditions controlled to substantially preclude reaction between the phenol and normal butylene, neutralizing the acid catalyst, removing normal butylene from the mixture by distillation and thereafter effecting rearrangement of the reaction products so produced by heating in the presence of a Friedel and Crafts catalyst.

19. The method of producing a para-tertiary alkyl phenol which comprises mixing an olefin composition containing branch chain olefin and normal olefin with phenol and effecting initial condensation between the phenol and the branch chain olefin in the presence of an acid catalyst under conditions controlled to substantially preclude reaction between the phenol and the normal olefin, neutralizing the acid catalyst, removing normal olefin from the mixture by distillation and thereafter effecting rearrangement of the reaction products so produced by heating in the presence of a Friedel and Crafts catalyst.

JOHN F. OLIN.

CERTIFICATE OF CORRECTION.

Patent No. 2,107,060.            February 1, 1938.

JOHN F. OLIN.

It is hereby certified that error appears in the printed specification of the above numbered patent requiring correction as follows: Page 3, second column, line 30, claim 2, for the word "of" read by; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.

ture in the presence of an acid catalyst under conditions controlled to substantially preclude reaction between the normal amylene of the mixture and said aromatic compound, neutralizing the acid catalyst, removing the normal amylene by distillation and thereafter effecting rearrangement of the reaction products so produced by heating in the presence of aluminum chloride.

16. The method of producing a para-tertiary alkyl cresol which comprises mixing an olefin composition containing branch chain olefin and normal olefin with cresol and effecting initial condensation between the cresol and the branch chain olefin in the presence of an acid catalyst under conditions controlled to substantially preclude reaction between the cresol and the normal olefin, neutralizing the acid catalyst, removing normal olefin from the mixture by distillation and thereafter effecting rearrangement of the reaction products so produced by heating in the presence of a Friedel and Crafts catalyst.

17. The method of producing a para-tertiary amyl cresol which comprises mixing an olefin composition containing branch chain amylene and normal amylene with cresol and effecting initial condensation between the cresol and the branch chain amylene in the presence of an acid catalyst under conditions controlled to substantially preclude reaction between the cresol and the normal amylene, neutralizing the acid catalyst, removing normal amylene from the mixture by distillation and thereafter effecting rearrangement of the reaction products so produced by heating in the presence of a Friedel and Crafts catalyst.

18. The method of producing para-tertiary butyl phenol which comprises mixing an olefin composition containing branch chain butylene and normal butylene with phenol and effecting initial condensation between the phenol and the branch chain butylene in the presence of an acid catalyst under conditions controlled to substantially preclude reaction between the phenol and normal butylene, neutralizing the acid catalyst, removing normal butylene from the mixture by distillation and thereafter effecting rearrangement of the reaction products so produced by heating in the presence of a Friedel and Crafts catalyst.

19. The method of producing a para-tertiary alkyl phenol which comprises mixing an olefin composition containing branch chain olefin and normal olefin with phenol and effecting initial condensation between the phenol and the branch chain olefin in the presence of an acid catalyst under conditions controlled to substantially preclude reaction between the phenol and the normal olefin, neutralizing the acid catalyst, removing normal olefin from the mixture by distillation and thereafter effecting rearrangement of the reaction products so produced by heating in the presence of a Friedel and Crafts catalyst.

JOHN F. OLIN.

CERTIFICATE OF CORRECTION.

Patent No. 2,107,060.                                                    February 1, 1938.

JOHN F. OLIN.

It is hereby certified that error appears in the printed specification of the above numbered patent requiring correction as follows: Page 3, second column, line 30, claim 2, for the word "of" read by; and that the said Letters Patent should be read with this correction therein that the same may conform to the record of the case in the Patent Office.

Signed and sealed this 14th day of June, A. D. 1938.

(Seal)                                              Henry Van Arsdale,
Acting Commissioner of Patents.

CERTIFICATE OF CORRECTION.

Patent No. 2,107,060.  February 1, 1938.

JOHN F. OLIN.

It is hereby certified that error appears in the printed specification of the above numbered patent requiring correction as follows: Page 3, second column, line 30, claim 2, for the word "of" read by; and that the said Letters Patent should be read with this correction therein that the same may conform to the record of the case in the Patent Office.

Signed and sealed this 14th day of June, A. D. 1938.

(Seal)

Henry Van Arsdale,
Acting Commissioner of Patents.